(No Model.) 2 Sheets—Sheet 1.

N. P. SHULIN.
LAWN MOWER.

No. 605,927. Patented June 21, 1898.

Witnesses:
R. J. Jacker.
E. A. Duggan.

Inventor:
Neal P. Shulin
By Chas. C. Tillman
Atty.

(No Model.) 2 Sheets—Sheet 2.
N. P. SHULIN.
LAWN MOWER.
No. 605,927. Patented June 21, 1898.
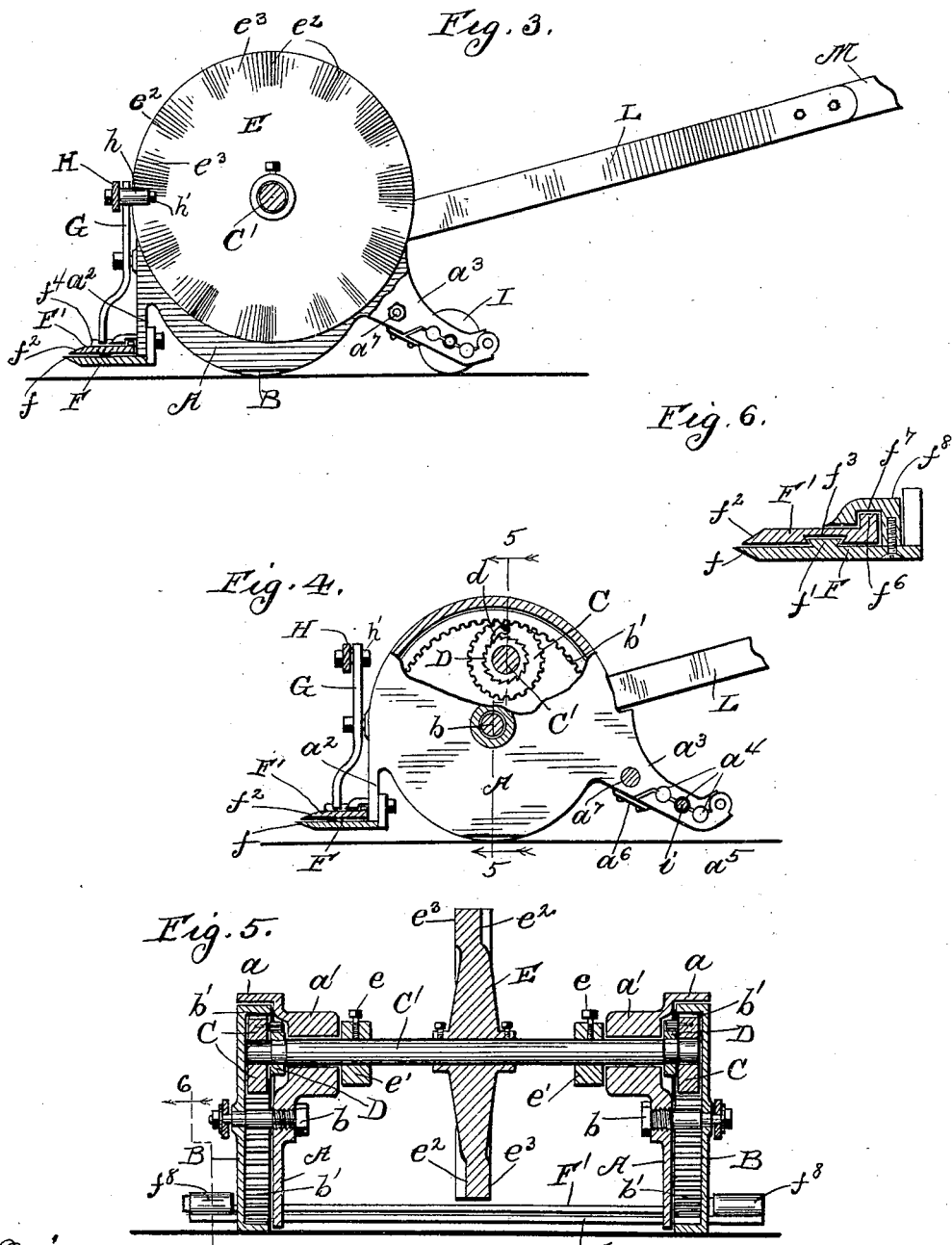
Witnesses:
R. J. Jaeker
E. A. Duggan
Inventor:
Neal P. Shulin
By Chas. C. Tillman, Atty.

UNITED STATES PATENT OFFICE.

NEAL P. SHULIN, OF BUTTE, MONTANA.

LAWN-MOWER.

SPECIFICATION forming part of Letters Patent No. 605,927, dated June 21, 1898.

Application filed July 22, 1897. Serial No. 645,531. (No model.)

*To all whom it may concern:*

Be it known that I, NEAL P. SHULIN, a citizen of the United States, residing at Butte city, in the county of Silver Bow and State of Montana, have invented certain new and useful Improvements in Lawn-Mowers, of which the following is a specification.

This invention relates to improvements in lawn-mowers, and is more especially adapted to that class of such mowers in which the propulsion is performed by hand-power; and it consists in certain peculiarities of the construction, novel arrangement, and operation of the various parts thereof, as will be hereinafter more fully set forth and specifically claimed.

The objects of my invention are, first, to provide a mower which shall be simple and inexpensive in construction, strong and durable, and effective in operation; second, such a mower which by reason of the peculiar construction and operation of its parts will cut the grass at any desired height—that is to say, from about one-half an inch to about six inches from the ground—and will perform the operation of cutting effectually and satisfactorily when the grass is wet or dry, and, third, a mower which shall be so constructed as to prevent the wheels and sickles becoming clogged by reason of the accumulation of the cut particles of grass or sticks and the like.

The fourth object of my invention is to provide a means for imparting to the cutter-bar a reciprocating movement which shall be so rapid as to render the blades self-cleaning.

In order to enable others skilled in the art to which my invention pertains to make and use the same, I will now proceed to describe it, referring to the accompanying drawings, in which—

Figure 1:
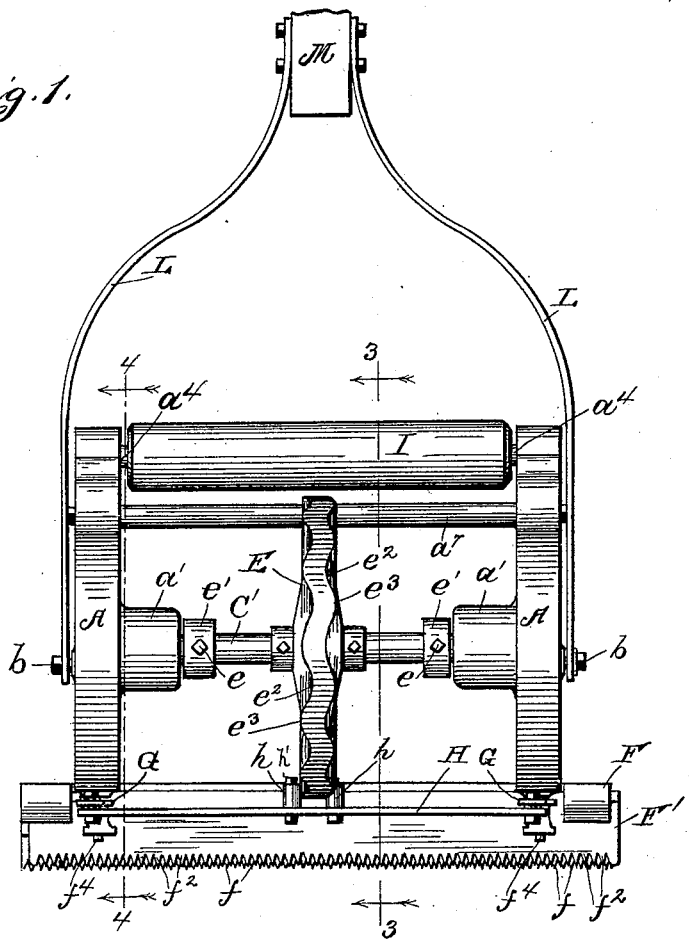
Figure 2:
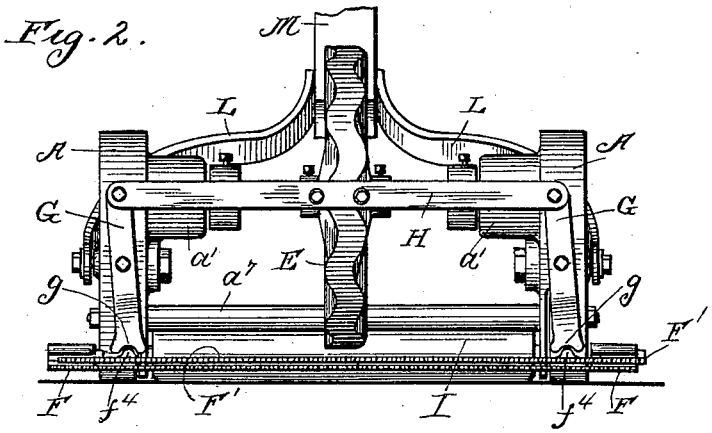

Figure 1 is a top plan view of my mower, showing a portion of the handle for propelling the same and illustrating the parts in position ready for use. Fig. 2 is a front or face view in elevation. Fig. 3 is a cross-sectional view, partly in elevation, taken on line 3 3 of Fig. 1, showing the cam or operating wheel for the cutter-bar and the following roller for adjusting the height of said bars. Fig. 4 is a view, partly in section, taken on line 4 4 of Fig. 1, showing one of the cogged gears which engages one of the main wheels and drives the shaft upon which the cam-wheel is mounted.
Fig. 5 is a longitudinal sectional view taken on line 5 5 of Fig. 4, as indicated by the arrows; and Fig. 6 is a detail sectional view of the finger and cutter-bars, taken on line 6 6 of Fig. 5, showing the manner of movably securing them together.

Similar letters refer to like parts throughout the different views of the drawings.

A represents the side pieces of the main or supporting frame and are made, as shown, circular and with outwardly-extending annular flanges $a$ to protect the upper portion of the main wheels B, which are mounted on suitable shafts $b$, secured to the side pieces A, as is clearly shown in Fig. 5 of the drawings. Each of the wheels B is provided with an internal annular gear $b'$, which meshes with a cogged gear C on each end of the shaft $C'$, which is also journaled in the side pieces A and somewhat above the axles $b$ of the main wheels. To provide secure journal-boxes for the shaft $C'$, the pieces A are formed on their adjacent surfaces with bosses $a'$ in their upper parts. Between the bosses $a'$ and the cogged gears C and keyed or otherwise secured to the shaft $C'$ near each of its ends are located ratchet-wheels D, which engage suitable pawls $d$ on the gears C, which gears are loosely mounted on the shaft $C'$, so that when the main wheels are revolved backward the shaft $C'$, upon which the cam-wheel E is mounted near its middle, will not revolve. Near each of the bosses $a'$ on the side pieces of the supporting-frame and on the shaft $C'$ is secured by means of a set-screw $e$ a collar $e'$ to hold the upper portions of the side pieces distended.

As is clearly shown in Figs. 1, 2, and 5 of the drawings, the cam-wheel E is provided on each of its sides with grooves $e^2$ and corresponding projections $e^3$, thus forming a worm or cam-shaped wheel for operating the cutter-bar, as will be presently explained.

The front part of each of the side pieces A is formed or provided with a downwardly-extending arm $a^2$, to which is secured the lower or stationary finger-bar F, which is provided at its front edge with teeth or fingers $f$ and on its upper surface, near each end, with a longitudinal rib $f'$ of dovetail shape in cross-section. On the finger-bar F rests the movable cutter-bar F', which is provided with knives or blades $f^2$ on its front edge and is formed in its lower surface, near each end, with a longitudinal dovetailed groove $f^3$ for the reception and operation of the rib $f'$ on the finger-bar. The upper surface of the bar F' is provided near each of its ends with a rounded lug or projection $f^4$ for engagement with the rocking levers G, which are pivotally secured to the front of the side pieces A near their middles and have in their lower ends arc-shaped bifurcations, as shown at $g$, to engage the rounded projections $f^4$ on the cutter-bar. To the upper end of each of the rocking levers G is pivotally secured a cross-bar H, which has projecting from its inner surface near its middle two bolts $h'$, on which are journaled rollers $h$, between and with which the cam-wheel E passes and engages. The cam-shaped faces cause the bar H to move from one side to the other of the machine, and through the rocking levers G impart a similar motion to the cutter-bar. The rear portion of each of the side pieces A constitutes a support for the roller I. By preference it is formed with a projection or arm $a^5$, consisting of a first member $a^3$, having in its lower edge a series of semicircular openings $a^4$, a second member hinged to the rear end of the first and provided with semicircular openings in its upper edge adapted to register with those in the first member, so as to form bearings for the axle $i$ of the roller I, and a bolt-plate $a^6$, secured to the first member and removably engaging the free end of the second member to hold it in operative position. This construction of the projection or arm $a^5$ is useful in order that the axle of the roller may be changed from one of the openings $a^4$ to another, thus raising or lowering the sickle-bars, as is apparent. The arms $a^3$ are connected by means of a brace-rod $a^7$, which serves to strengthen the rear portion of the frame. To the outer ends of the axles $b$ of the main wheels is secured a yoke L, to the rear portion of which is connected a handle bar or piece M for propelling the mower.

From the foregoing and by reference to the drawings it will be seen and clearly understood that by propelling the machine in the direction indicated by the arrow in Fig. 4 of the drawings the cogged gears C, carrying the pawls $d$, will be rotated in the same direction and the pawls engaging with the ratchets D will cause the shaft C' to turn, which will revolve the cam-wheel E, through which and the cross-bar H and rocking levers G a reciprocating movement will be imparted to the upper sickle-bar, which movement will be very rapid and positive and will cause the grass to be thoroughly and quickly cut at the desired height. It is also apparent that the rapid movement of said sickle-bar will prevent the sickle-bars becoming choked by means of the cut grass or other material. It is evident that when the machine is drawn backward the pawls $d$ will not engage the ratchets and the motion of the shaft C', upon which the cam-wheel is mounted, will not be reversed.

By reference to Figs. 5 and 6 of the drawings it will be seen that the rear edge of the upper sickle-bar F', near its ends, is provided with a tenon $f^6$, which fits and operates in a suitable mortise $f^7$ in a piece $f^8$, secured near the rear edge and at the ends of the lower sickle-bar, thus providing additional guides for the upper sickle-bar.

Having thus fully described my invention, what I claim as new, and desire to secure by Letters Patent, is—

1. In a lawn-mower, the combination with the frame consisting of two side pieces mounted on driving-wheels and provided with outwardly-projecting flanges, downwardly-projecting arms at the rear thereof, a roller adjustably journaled in said arms, a brace-rod connecting them and extending across the frame, downwardly-projecting arms at the front of said pieces, a finger-bar secured near the lower ends of the front arms and extending across the frame, and a cutter-bar movable thereover; of levers pivoted to the front arms, connections between the lower ends of the levers and the reciprocating cutter-bar, a cross-bar connecting the upper ends of the levers, rollers on the inner face of this bar in proximity to each other, a shaft journaled in and across the frame above the main axles and rotated by the driving-wheels, a cam-wheel on said shaft and standing between the rollers, collars on the shaft inside the side pieces, and set-screws for clamping said collars to their shaft so as to hold them against the side pieces and the latter distended, substantially as described.

2. In a lawn-mower, the combination with a frame, geared drive-wheels journaled therein, outwardly-extending flanges on the frame above the wheels, arms projecting downwardly from the rear thereof, a roller adjustably journaled in the arms and across the frame, and downwardly-extending arms at the front of the frame; of a shaft journaled in and extending across the frame above the main axles, gear-wheels on the ends of this shaft meshing with the geared driving-wheels, a double-faced cam-wheel secured to the shaft between its ends, a backing-ratchet between one gear and drive wheel, a finger-bar secured to the lower ends of the front arms, a cutter-bar moving thereover and provided on its upper face with a rounded projection near each end, levers pivoted to the front arms and provided in their lower ends with bifurcations standing astride said projections, a cross-bar connecting the levers, and rollers on said cross-bar one on either side of and in engagement with the cam-wheel, all substantially as described.

3. In a lawn-mower, the combination with the frame mounted on driving-wheels, a cam-wheel rotated thereby, a finger-bar carried by the frame and having a dovetailed rib on its upper face, a cutter-bar having a longitudinal groove fitting over said rib, and rounded projections on the upper face of the cutter-bar; of levers pivoted to the frame and having arc-shaped bifurcations in their lower ends receiving said projections, a cross-bar connecting said levers, bolts mounted in said cross-bar, and rollers journaled thereon on opposite sides of the cam-wheel, as and for the purpose set forth.

NEAL P. SHULIN.

Witnesses:
  JOHN CALLAN,
  JOHN STECH.